United States Patent [19]

Shimooka et al.

[11] 4,321,620
[45] Mar. 23, 1982

[54] COLOR SCANNER FOR PLATE MAKING

[75] Inventors: Riyo Shimooka; Hitomi Atoji; Takeshi Yamazaki, all of Kyoto; Masuo Kunisawa, Uji, all of Japan

[73] Assignee: Dainippon Screen Seizo Kabushiki Kaisha, Kyoto, Japan

[21] Appl. No.: 864,758

[22] Filed: Dec. 27, 1977

[30] Foreign Application Priority Data

Dec. 28, 1976 [JP] Japan ................. 51-159899

[51] Int. Cl.³ .............................................. H04N 1/46
[52] U.S. Cl. ...................................................... 358/75
[58] Field of Search ..................................... 358/75–80

[56] References Cited

U.S. PATENT DOCUMENTS

| | | | | |
|---|---|---|---|---|
| 2,165,168 | 7/1939 | Hardy | | 358/80 |
| 3,230,303 | 1/1966 | Macovski et al. | | 358/77 |
| 3,288,925 | 11/1966 | Mog | | 358/75 X |
| 3,535,434 | 10/1970 | Crittenden | | 358/75 |
| 3,911,480 | 10/1975 | Brucker | | 358/75 |
| 3,934,083 | 1/1976 | Plath | | 358/78 |

Primary Examiner—Aristotelis M. Psitos
Attorney, Agent, or Firm—Lackenbach, Siegel, Marzullo, Presta & Aronson

[57] ABSTRACT

A color scanner comprising an original picture cylinder, a scanning head, a reproduction picture cylinder, and a recording head; and said device having several parallel frame plates with holes simultaneously bored through them in the same relative positions, bearings mounted to the holes, and guide shafts and bearing shafts mounted in the bearings. A single feed screw mounted through said openings in at least some of said frame plates moving the scanning and recording heads synchronously in the axial direction of the cylinders.

2 Claims, 5 Drawing Figures

COLOR SCANNER FOR PLATE MAKING

BACKGROUND OF THE INVENTION

This invention relates to a color scanner for plate making, and more particularly to improvements in a photoelectric scanning color separation machine for plate making. The machine involves scanning photoelectrically an original color picture to obtain picture signals, converting the picture signals into color separation signals by electronic circuits, controlling light exposure amounts for scanning a recording cylinder by the color separation image signals, and making color separation printing plates such as yellow, magenta, cyan and black.

In a color scanner of the cylinder scanning type, in general, scanning is performed by moving synchronously a pick-up head for picking up color signals from an original picture and an exposure head for recording a reproduction picture along the axes of, respectively, a picture cylinder with an original picture attached thereon and a recording cylinder with a recording film attached thereon, which cylinders are synchronously rotated.

In this case the pitch of the scanning lines, i.e., the distance the head moves per one revolution of the cylinder, is generally minute, such as 0.025 to 0.05 millimeters. Furthermore, slight irregularity of the pitch results in a conspicuous uneven stripe in the reproduction picture. Accordingly, it is necessary to provide quite an accurate driving mechanism.

In order to prevent shading, distortion, and so on, the pick-up head and the exposure head must be moved exactly parallel to the cylinder axis and be kept at an exact distance from the cylinders. Consequently, it is also necessary to provide quite an accurate moving mechanism.

Further, the cylinders are rotated at a fairly high speed of about 500 revolutions per minute. Thus, the machine must have a rigid construction to prevent ragged outlines in the reproduction picture being caused by vibration of the rotating parts of the machine.

Conventional color scanners for plate making have been constructed using an iron or aluminium base made by casting or welding, and flattening its upper surface by mechanical processing. Then mounted on said base by means of bearings is an original picture cylinder and a recording cylinder, and guide rails for supporting a pick-up head and an exposure head and a moving shaft for moving the heads are also disposed on the base.

However, in these previous scanners each cylinder and each head have been independently mounted on the base, and thus it has been quite difficult to assure accurate relative positions of the components, particularly parallel positions of the axes of the cylinders to the lines of motion of the heads. Hence, it has been necessary for expert engineers to perform delicate final adjustments of the finished machines. This has resulted in long assembly processes, and, accordingly, high cost.

Furthermore, machines constructed in the manner described above are liable to have their accuracy reduced by vibrations from outside, temperature variations and the like. Consequently, the machines are rather troublesome to maintain, and their durability is relatively short. This means poor economy.

SUMMARY OF THE INVENTION

It is an object of the present invention to provide a color scanner for plate making which is free from the abovementioned defects and which is simple, compact, and readily constructible, and to provide one which has superior accuracy and durability.

These and other objects of the invention are attained according to the present invention by a color scanner for plate making, comprising:

an original picture scanning means which comprises an original picture cylinder for an original picture and a pick-up head for photoelectrically scanning the original picture to obtain image signals, which is movable in the axial direction of the original picture cylinder;

a reproduction image recording means which comprises a recording cylinder carrying a photosensitive material and an exposure head for recording a reproduction image by using the image signals, which is movable in the axial direction of the recording cylinder;

a plurality of parallel frame plates having similar shapes, which are arranged in parallel with one another, each frame plate including a similar set of openings in the same relative position;

a pair of parallel guide members which are fitted through said openings in at least some of said frame plates and support the heads;

a common shaft for supporting coaxially the cylinders, which is fitted in bearings mounted to said openings in at least some of the frame plates and is parallel to the pair of parallel guide members; and a single feed screw mounted through said openings in at least some of said frame plates and said single feed screw moving all of said heads synchronously in the axial direction of the cylinders, which is parallel to said pair of parallel guide members.

BRIEF DESCRIPTION OF THE DRAWINGS

The present invention will now be described in more detail with reference to a preferred embodiment, illustrated in the accompanying drawings, in which.

DESCRIPTION OF THE PREFERRED EMBODIMENTS

Figure 1:
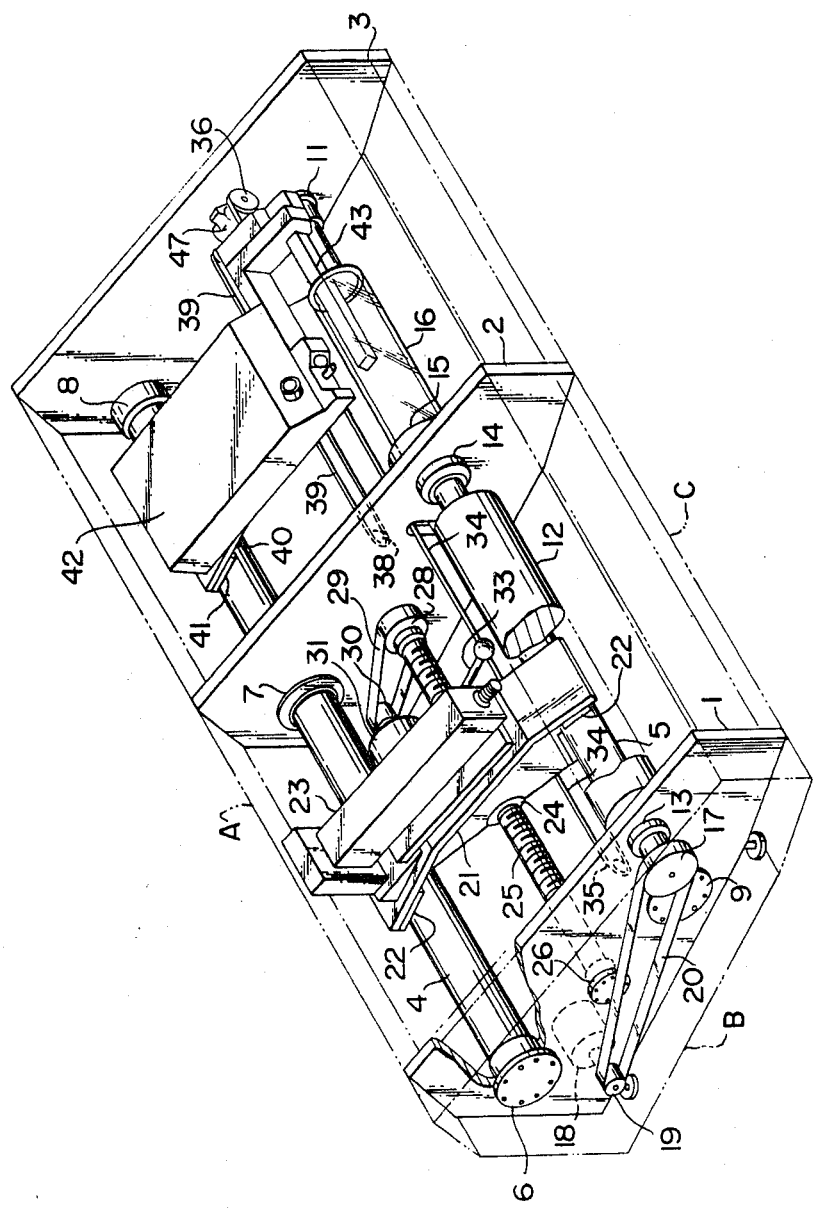
FIG. 1 is a perspective view of a color scanner according to the present invention, with its upper cover, lower cover, and side cover removed from the machine.

Referring to the drawings, there is shown a color scanner according to the present invention, in which an upper cover A, a lower cover B, and a side cover C are removed, as shown by the two-dotted lines.

Figure 2:
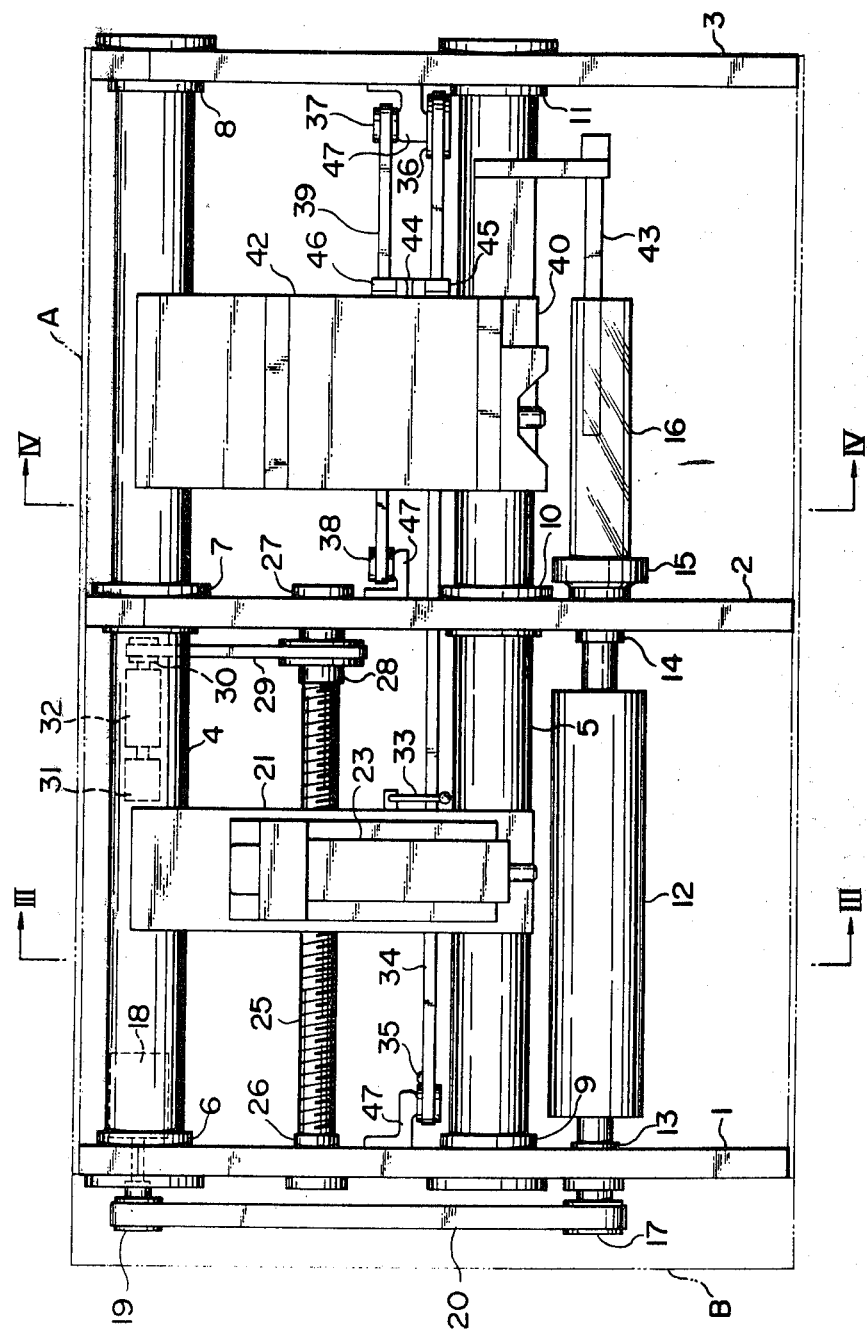
FIG. 2 is a plan view of the color scanner of FIG. 1.
Figure 5:
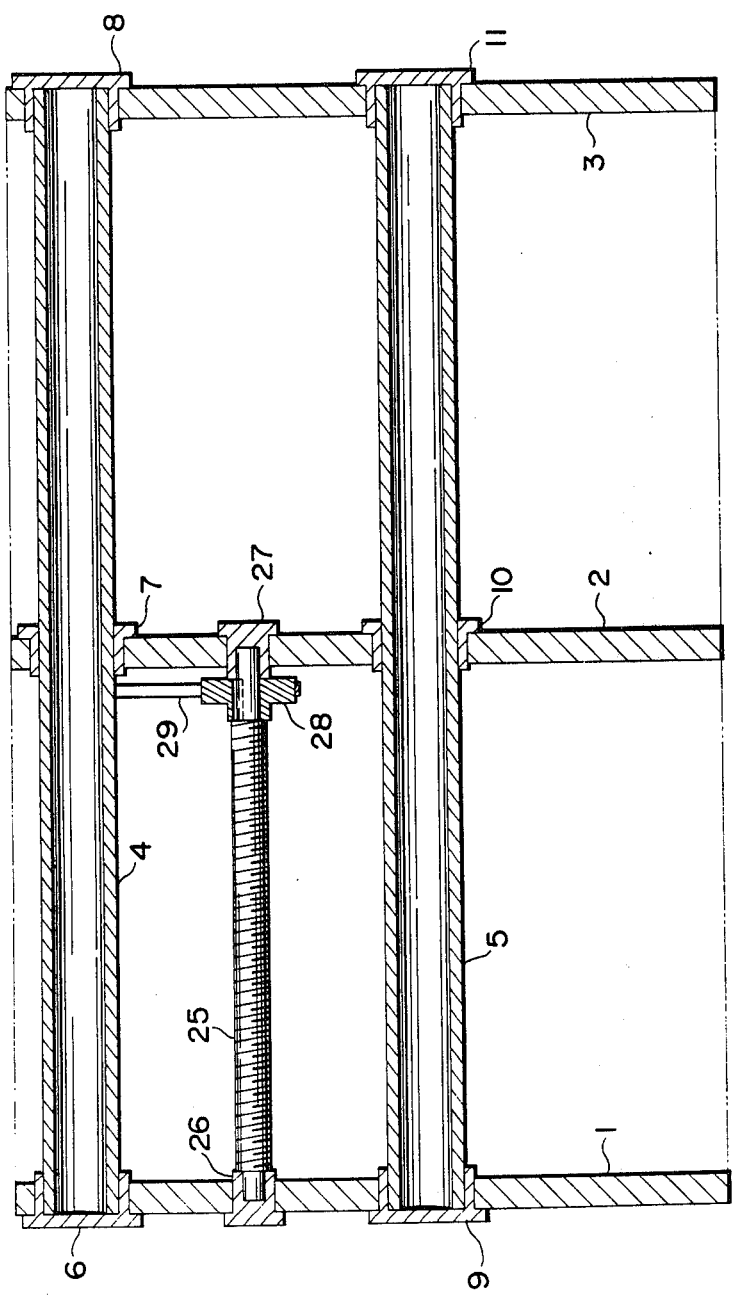
FIG. 5 is a transverse sectional view of the color scanner, taken along the line V—V in FIG. 3.

As shown in FIGS. 1, 2, and 5, a left frame plate 1, a middle frame plate 2, and a right frame plate 3 are arranged in parallel to one another at a certain spacing. Each frame plate 1, 2, and 3 includes two openings at the same relative positions for mounting flanges 6, 7, 8, 9, 10 and 11, through which a pair of tubular guide members 4 and 5, which support an exposure head 23 and a pick-up head 42, are disposed so as to be parallel to one another. The openings for mounting the flanges 6–11 may be made by drilling the three frame plates, while they are placed one upon another, in a single operation, so that the pair of tubular guide members 4 and 5 may be positioned perfectly in parallel when assembled.

The left frame plate and the middle frame plate each further includes two openings, one for mounting the bearings 13 and 14 which rotatably support a common shaft for supporting coaxially a recording cylinder 12 and an original picture cylinder 16, and the other for mounting bearings 26 and 27 which rotatably support a feed screw 25 for moving the exposure head 23 and the pick-up head 42. The openings for mounting the bearings 13, 14, 26, and 27 may be made in the same manner as the openings for mounting the flanges 6–11. Consequently, the pair of tubular guide members 4 and 5, the common shaft and accordingly the recording cylinder 12 and the picture cylinder 16, and the feed screw 25 are positioned exactly in parallel.

The common shaft supporting the recording cylinder projects to the right and the left sides through the bearings 13 and 14. On the right hand projection of this common shaft a socket 15 for removably mounting the picture cylinder 16 is disposed. The picture cylinder 16 is made of a transparent plastic material. Various picture cylinders 16 having different diameters may be mounted to the socket 15 according to the desired reproduction magnification.

On the left hand projection of the common shaft a pulley 17 is disposed. This common shaft is driven by a motor 18 fixed to the frame plate 1 via the pulley 17, a pulley 19 mounted to the shaft of the motor 18, and a belt 20 tensioned therebetween.

Figure 3:
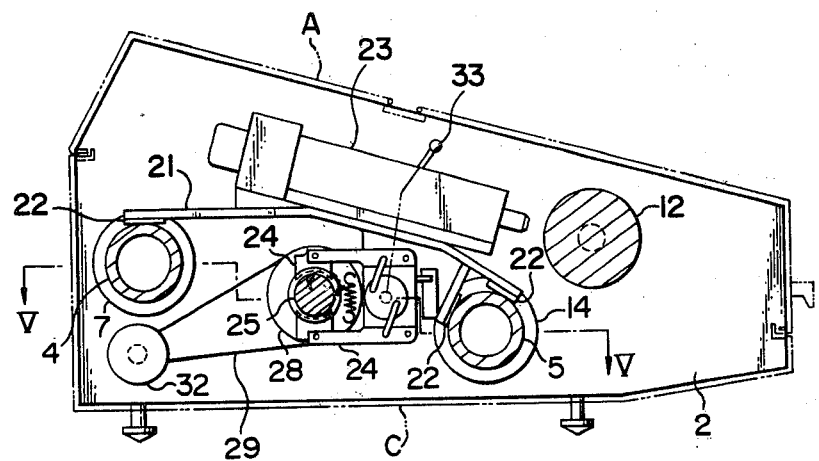
FIG. 3 is a longitudinal sectional view of the color scanner, taken along the line III—III in FIG. 2.

A support member 21 for the exposure head 23 is placed on the tubular guide members 4 and 5 between the left frame plate 1 and the middle frame plate 2. The support member 21 includes a front support portion and a rear support portion, the front support portion comprising a front support plate and a rear support plate which projects downwards at a substantially right angle with respect to the front support, as best shown in FIG. 3.

The support member 21 is in contact with the tubular guide members at the ends of the front and the rear support plates and the rear support portion, and at the contact parts thereof antifriction members 22 made of a material, such as "DU Slide" (trademark) manufactured by Daido Metal Industry Co., Ltd. are attached, so that the support member 21 may move smoothly along the tubular guide members 4 and 5.

The exposure head 23 may be of a conventional type used in a known color scanner for plate making, which includes, among other things, a light source, and an optical system, which projects light onto a film attached to the recording cylinder 12 and records a reproduction picture by varying the light projected in response to the picture signals.

A clutch device 24 including half nuts is arranged under the support member 21 so as to be engaged or disengaged with the feed screw 25 by operating a lever 33. The feed screw 25 is supported by a pair of bearings 26 and 27 which are mounted to the frame plates 1 and 2 respectively. The feed screw 25 is driven by a motor 31, a reduction gear 32 connected to the motor 31, a pulley 30 mounted to a shaft of the reduction gear 32, a pulley 28 disposed to the feed screw 25, and a belt 29 stretched between the two pulleys 28 and 30.

As the feed screw 25 rotates, when the clutch device 24 is engaged with the feed screw 25, the exposure head 23 supported by the support member 21 is moved along the tubular guide members 4 and 5 and the exposure head 23 scans or exposes the entire surface of the film attached to the recording cylinder 12, as the recording cylinder 12 rotates.

A first steel belt 34 is suspended between a pair of pulleys 35 and 36, one pulley 35 being supported by a left side bearing and associated bracket 47 mounted on the left frame plate 1, and the other pulley 36 being supported by a right side bearing and similar bracket 47 mounted on the right frame plate 3. The support member 21 for the exposure head 23 is suitably connected to the first steel belt 34, and accordingly the first steel belt 34 is driven as the feed screw 25 is rotated.

A second steel belt 39 is tensioned between a pulley 37, which has a different diameter from the pulley 36, and is coaxially mounted to the right bearing and associated bracket 47 disposed on the right frame plate 3, and a pulley 38 which is mounted to another intermediate bearing bracket 47 disposed on the middle frame plate 2. Hence, the first and the second steel belts are rotated with different speeds in the same direction.

Figure 4:
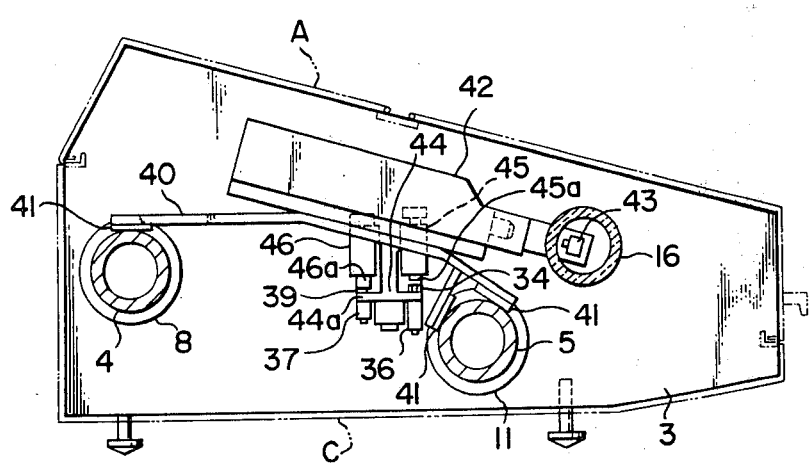
FIG. 4 is a longitudinal sectional view of the color scanner, taken along the line IV—IV in FIG. 2.

A support member 40 for the pick-up head 42 is also placed on the tubular guide members 4 and 5 between the middle frame plate 2 and the right frame plate 3. The support member 40 has the same structure as the support member 21 described above, and also includes antifriction members 41 at its contact points with the tubular guide members 4 and 5, as best shown in FIG. 4.

The pick-up head 42 may be of a conventional type used in a color scanner already known for plate making, which includes, among other things, a light source, color separation filters, and a photoelectric transducer, and which scans an original picture attached to the original picture cylinder 16 and puts out picture signals converted from light received by the photoelectric transducer.

An illumination pipe 43 disposed adjacent and attached to the pick-up head 42 is moved in the picture cylinder 16 along its axis and lights up the original picture from the inside of the picture cylinder 16.

A T-shaped bracket 44 having a horizontal arm 44a is suspended vertically from the support member 40, and its upper surface contacts the lower surfaces of the steel belts 34 and 39. A pair of electromagnets 45 and 46 with plungers 45a and 46a, respectively, are so arranged on the side of the support member 40 such that each plunger may descend and hold the steel belt 34 or 39 in co-operation with the horizontal arm 44a of the T-shaped bracket 44.

Consequently, when the electromagnet 45 is activated, the steel belt 34 is clamped between the plunger 45a and the arm 44a, and thus the pick-up head 42 is moved at the same speed as the exposure head 23, and in the same direction. On the other hand, when the electromagnet 46 is activated, the steel belt 39 is clamped between the plunger 46a and the arm 44a, and thus the pick-up head 42 is moved at the speed corresponding to the ratio of the diameters of the pulley 36 and the pulley 37.

If a reproduction picture having the same size as an original picture is to be recorded, a picture cylinder 16 having the same diameter as a recording cylinder 12 is used, and both of the cylinders 16 and 12 are rotated at the same speed, and the electromagnet 45 is activated so as to hold the the steel belt 34, as described above.

On the other hand, if a reproduction picture having different size from an original picture is to be recorded, a picture cylinder 16 having a diameter corresponding to the reciprocal of a desired magnification with respect to the recording cylinder 12 is used, and the electromagnet 46 is activated so as to hold the steel belt 39, as mentioned before.

From the above description, it is apparent that according to the present invention a color scanner for plate making is provided which has a simple and compact construction so as to be readily constructed even by an inexpert engineer and is quite accurate and durable over a long running period. Accordingly it is economical to install and maintain.

Although there has heretofore been described in detail a preferred embodiment of the present invention, it should be understood that various modifications can be made. For example, the feeding speed of the pick-up head may be changed to be multi-step, if necessary. That is, there may be provided a plurality of pulleys having different diameters on the axis of the pulleys 36 and 37, a plurality of idler pulleys on the axis of the pulley 38, a plurality of steel belts stretched between the plurality of pulleys, and a plurality of electromagnets on the support member 40 so that each electromagnet may hold the corresponding steel belt. In this case, a plurality of picture cylinders are also required and are changed to correspond to the reproduction magnification.

Further, more than 3 frame plates may be used to compose more than 2 chambers. In this case, for instance, one chamber may be used for scanning an original picture, while the others are used for recording various color separation reproduction pictures at the same time. Alternatively, one chamber may be used for recording a composite picture, while the others are used for scanning a plurality of original pictures at the same time. Although the present invention has been described in some detail by way of illustration and example for purposes of clarity of understanding, it will, of course, be understood that various changes and modifications, such as the alternate embodiments noted in this and the preceding paragraph, may be made in the form, details, and arrangements of the parts without departing from the scope of the invention as set forth in the following claims.

What we claim is:

1. A color scanner of substantially rigid construction for plate making, comprising:
    an original picture scanning means which comprises an original picture cylinder for an original picture and a pick-up head for photoelectrically scanning the original picture to obtain image signals, which is movable in the axial direction of the original picture cylinder;
    a reproduction image recording means which comprises a recording cylinder carrying a photosensitive material and an exposure head for recording a reproduction image by using the image signals, which is movable in the axial direction of the recording cylinder;
    a plurality of matched frame plates having similar shapes, which are arranged in parallel with one another, each frame plate including openings in the same relative position;
    a pair of parallel guide members are fitted through sets of said openings in at least three of said frame plates and support the heads;
    a common shaft for supporting coaxially the cylinders, is fitted in bearings mounted to a set of said openings in at least two of the frame plates and is parallel to the pair of parallel guide members; and a single feed screw mounted generally between said guide members and extending through another set of said openings in at least two adjacent frame plates and said single feed screw moving all of said heads synchronously in the axial direction of the cylinders, which is parallel to said pair of parallel guide members; whereby said guide members, said common shaft and said cylinders, and said feed screw are all positioned substantially in parallel with respect to each other, thereby minimizing reproduction errors in a reproduction picture.

2. A color scanner according to claim 1, wherein the original picture scanning means comprises only one original picture cylinder and one pick-up head, and the reproduction image recording means comprises only one recording cylinder and only one exposure head.

* * * * *